United States Patent [19]
Emig et al.

[11] Patent Number: 5,655,819
[45] Date of Patent: Aug. 12, 1997

[54] ANTI-SKID FLUID PRESSURE CONTROL APPARATUS

[76] Inventors: Reiner Emig, 20-17, 3 chome, Denenchofu, Ota-ku, Tokyo; Tetsuro Arikawa, 942-119 Mutsuura-cho, Kanazawa-ku, Yokohama-shi, Kanagawa-ken, both of Japan

[21] Appl. No.: 626,321

[22] Filed: Apr. 2, 1996

[30] Foreign Application Priority Data

Apr. 5, 1995 [JP] Japan .................. 7-104809

[51] Int. Cl.[6] .................................................. B60T 8/32
[52] U.S. Cl. ........................ 303/116.1; 303/113.1; 303/119.1; 303/189; 303/900
[58] Field of Search .................. 303/119.1, 119.2, 303/116.1, 116.2, 900, 901, 6.01, 15, 122.09, 84.1, 84.2, DIG. 3, DIG. 4, DIG. 1, 10–12, 9.72, 189, 188, 187, 186, 113.1

[56] References Cited

U.S. PATENT DOCUMENTS

| | | | |
|---|---|---|---|
| 3,549,212 | 12/1970 | Leiber | 303/119.1 |
| 4,637,664 | 1/1987 | Arikawa | 303/186 |
| 4,687,260 | 8/1987 | Matsui et al. | 303/116.1 |
| 4,708,406 | 11/1987 | Takagi et al. | 303/116.1 |
| 4,715,667 | 12/1987 | Otsuki et al. | 303/116.1 |
| 4,738,493 | 4/1988 | Inagaki et al. | 303/116.1 |
| 4,743,074 | 5/1988 | Inoue | 188/106 P |
| 4,776,644 | 10/1988 | Arikawa | 303/186 |
| 4,778,223 | 10/1988 | Inoue | 188/106 P |
| 4,844,558 | 7/1989 | Ishii et al. | 303/116.1 |
| 4,971,401 | 11/1990 | Arikawa | 303/186 |
| 4,986,612 | 1/1991 | Arikawa | 303/186 |
| 5,090,780 | 2/1992 | Powell | 303/15 |
| 5,167,442 | 12/1992 | Alaze et al. | 303/116.1 |
| 5,441,336 | 8/1995 | Takeuchi | 303/900 |
| 5,482,361 | 1/1996 | Burckhardt et al. | 303/186 |
| 5,531,514 | 7/1996 | Nishii et al. | 303/116.1 |
| 5,544,547 | 8/1996 | Nishii et al. | 303/900 |
| 5,544,946 | 8/1996 | Toyoda et al. | 188/106 P |

FOREIGN PATENT DOCUMENTS

199216  7/1994  Japan .

*Primary Examiner*—Douglas C. Butler
*Attorney, Agent, or Firm*—Rudnick & Wolfe

[57] ABSTRACT

An anti-skid fluid pressure control apparatus including a pair of hydraulic units, each of the hydraulic units consists of a first pair of pressurized fluid supply conduits; a second pair of pressurized fluid supply conduits; a first pair of brake-relieving conduits; a second pair of brake-relieving conduits; fluid pressure pump; hydraulic reservoir; first electro/magnetic inlet valves arranged in the first pair of pressurized fluid supply conduits, respectively; second electro-magnetic inlet valves arranged in said second pair of pressurized fluid supply conduits, respectively; first electro-magnetic outlet valves arranged in the first pair of brake-relieving conduits, respectively; and second electro-magnetic outlet valves arranged in the second pair of brake-relieving conduits, respectively; first connecting conduits for connecting one ends of the first and second pairs of pressurized fluid supply conduits in one of the hydraulic units, to a first brake fluid pressure generating chamber of a tandem master cylinder.

2 Claims, 4 Drawing Sheets

ANTI-SKID FLUID PRESSURE CONTROL APPARATUS

BACKGROUND OF THE INVENTION

1. Field of the Invention

This invention relates to an anti-skid fluid pressure control apparatus.

2. Description of the Prior Art

FIG. 1 shows a conduit system of an anti-skid fluid pressure control apparatus of a Prior Art. In FIG. 1, two fluid pressure generating chambers are formed in a cylinder body 3 of a tandem master cylinder 1. A brake pedal 4 is connected through a booster 2 to the cylinder body 3. By depressing the brake pedal 4, fluid pressures are generated in the two fluid pressure generating chambers respectively. The fluid pressures are transmitted through conduits 5a, 5b, electro-magnetic inlet valves 17a, 17b to wheel cylinders of a left front wheel FL and a right rear wheel RR. The conduits 5a, 5b are divided into conduits 7a and 6a, and, 7b and 6b respectively. Electro-magnetic inlet valves 20a, 20b having the same constructions as the inlet valves 17a, 17b are connected in the conduits 6a and 6b. They are connected to wheel cylinders of a right front wheel FR and a left rear wheel RL. The fluid pressures are transmitted through the conduits 6a, 6b and inlet valves 20a, 20b to the wheel cylinders of the wheels FR and RL. Further, the wheel cylinders of the wheels FL, FR, RL, RR are connected through brake relieving conduits 8a and 8b to low-pressure hydraulic reservoirs 25a and 25b. The hydraulic reservoirs 25a and 25b have the well-known construction. A piston is slidably fitted into a casing and urged by a relatively weak spring in the hydraulic reservoir 25a, 25b. Fluid reserving chambers of the hydraulic reservoirs 25a and 25b are connected to suction side of a fluid pressure pump 10.

The fluid pressure pump 10 has the well-known construction. It consists of an electric motor 11, an eccentric mechanism 12 and check valves 15a, 15b, 13a and 13b. A pair of plungers are moved backwards and forwards in the opposite directions. With the movement of the pair of the plungers, the check valves 13a and 13b, 15a and 15b are alternately opened and closed. Thus, the pressurized fluid is supplied to the conduits 5a and 5b.

Wheel speed sensors are associated with the wheels FL, FR, RL and RR, although they are not shown. When the vehicle provided with the apparatus of FIG. 1, is running on the road, the rotational speeds of the wheels FL, FR, RL and RR are detected by the not-shown wheel speed sensors. The outputs of the wheel speed sensors are supplied to a control unit 30. The control unit 30 has the well-known circuit construction and it judges the skid conditions of the wheels FL, FR, RL and RR. By the judgement results, the above described change-over valves 17a, 17b, 20a, 20b, 23a, 23b, 24a and 24b are selectively energized or deenergized.

For facilitating the understanding, it is assumed that all of the four wheels FL, FR, RL and RR are in the same skid conditions. When the brake pedal 4 is depressed, the pressurized fluid from the master cylinder 1 is transmitted through the conduits 5a 5b, and the inlet valves 17a, 17b, 20a and 20b to the where cylinders of the wheels FL, FR, RL and RR. According to the surface condition of the road and the manner of depressing the brake pedal 4, the control unit 30 now judges that the brake should be maintained at constant. Thus, solenoid portions s of the inlet valves 17a, 17b, 20a and 20b are energized. Thus, these change-over valves are put into the cut condition. Accordingly, the pressurized fluid are held in the wheel cylinders of the wheels FL, FR, RL and RR. Thus, the braking force is maintained at constant. Next, the control unit 30 judges that the brake should be relieved. Thus, the solenoid portions s of the outlet valves 23a, 23b, 24a and 24b are energized, while the solenoid portions s of the inlet valves 17a, 17b, 20a, 20b remain energized. Accordingly, the pressurized fluid from the wheel cylinders of the wheels FL, FR, RL and RR are discharged through the conduits 8a and 8b into the hydraulic reservoirs 25a and 25b.

Next, the control unit 30 judges that the brake should be reapplied. In this Prior Art, the brake is stepwisely increased. Accordingly, the solenoid portions s of the outlet valves 23a, 23b, 24a and 24b are deenergized, while the solenoid portions s of the inlet valves 17a, 17b, 20a and 20b are intermittently energized and deenergized. Thus, the fluid pressure is stepwisely increased in the wheel cylinders of the wheels FL, FR, RL and RR.

Next, details of the inlet valves 17a, 17b, 20a and 20b of the Prior Art will be described with reference to FIG. 2. They have the same construction. Representatively, the inlet valve 17a will be described. In FIG. 2, a bobbin 32 is supported on a coil support member 30. An electro-magnetic coil 33 is wound on the bobbin 32 and it corresponds to the solenoid portions s of the inlet valves 17a, 17b, 20a and 20b in FIG. 1. A casing 36 and a guide member 35 are arranged along the central axis of the coil 33. They are combined with each other in a coil casing 31. An armature 34 and a rod 37 contacting with the armature 34 are slidably fitted into the casing 36 and the guide member 35, respectively. The armature 34 is driven downwards by energizing the coil 33. An O-ring 38 and a cup-seal 39 are fitted onto the guide member 35. Although not shown in FIG. 2, the other inlet valves 17b, 20a and 20b and outlet valves 23a, 23b, 24a and 24b and the fluid pressure pump 10 are liquid-tightly arranged commonly in a casing block K.

A steel valve ball 44 is fixed to a lower end of the rod 37. It faces a valve seat 40b formed at an upper end of a valve seat forming member 40, at a distance from each other by a valve lift L. A coil spring 45 is pressedly extended between the rod 37 and the valve-seat forming member 40. It urges the rod 37 upwards. Thus, the rod 37 is positioned at an upper position as shown in FIG. 2. A path 40a of the rod 37 communicates with the conduit 5a connected to the master cylinder 1. And a valve chamber 42 formed in the guide member 35, in which the valve ball 44 is arranged, communicates with the conduit 7a connected to the wheel cylinder of the wheel FL.

The inlet valve 17a of the Prior Art is constructed as in the above described manner. When an energizing signal is supplied to the electro-magnetic coil 33 as the solenoid portion s from the control unit 30, the armature 34 is magnetically attracted downwards. The rod 37 is pushed and moved downwards with the armature 34. The valve ball 44 fixed to the lower end of the rod 37 comes to seat on the valve sheet 40b. Thus, the master cylinder side is cut off from the wheel cylinder side. When the energizing signal is cut off, the rod 37 is moved upwards by the spring force of the coil spring 45. Thus, the valve ball 44 is separated from the valve sheet 40b and the brake fluid is returned into the master cylinder.

The inlet valves 17a, 17b, 20a and 20b are constructed as in the above described manner. Although the outlet valves 23a, 23b, 24a and 24b are usually put in the cut state, they are constructed as in the above described inlet valve. As clear from FIG. 2, the brake fluid is flowed into the wheel cylinder side through the valve lift L or the space between the valve ball 44 and the valve seat 40b. When the vehicle provided with the apparatus of FIG. 1 is large such as a truck, the amount of the brake fluid from the master cylinder into the wheel cylinder on braking is large and so a large amount of the brake fluid is returned from the wheel cylinder into the master cylinder on brake-relieving. Thus, in accordance with the amount of the brake fluid on braking and relieving, the magnitude of the valve ball 44 and so the magnitude of the valve seat such as an opening angle is determined. When the amount of the pressure fluid is large, the valve ball 44 is large and the valve lift is long. Accordingly the spring force of the spring 45 and the capacity of the electro-magnetic coil 33 for driving the armature 34 and the rod 37 should be large. As the result, the entire of the valve apparatus becomes very large.

Accordingly, when the anti-skid control fluid pressure control apparatus as shown in FIG. 1 and FIG. 2 is used for the automobile (passenger car), the capacity of the inlet valves 17a, 17b, 20a and 20b and the outlet valves 23a, 23b, 24a and 24b should be changed and larger for a larger vehicle such as a truck. If the inlet valves 17a,17b, 20a and 20b and the outlet valves 23a, 23b, 24a and 24b are standardized for the auto-mobile (passenger car), they should be manufactured by a special specification for the larger vehicle such as a truck. Accordingly, the cost of an anti-skid control apparatus for large vehicle such as a truck becomes high.

SUMMARY OF THE INVENTION

Accordingly it is an object to provide an anti-skid fluid pressure control apparatus which can lower the manufacturing cost, using the parts and components for the usual auto-mobile. In accordance with an aspect of this invention, an anti-skid fluid pressure -control apparatus comprising;

(A) a pair of hydraulic units, each of said hydraulic units comprising;
  (a) a first pair of pressurized fluid supply conduits;
  (b) a second pair of pressurized fluid supply conduits;
  (c) a first pair of brake-relieving conduits;
  (d) a second pair of brake-relieving conduits;
  (e) fluid pressure pump means;
  (f) hydraulic reservoir means;
  (g) first electro-magnetic inlet valves arranged in said first pair of pressurized fluid supply conduits, respectively;
  (h) second electro-magnetic inlet valves arranged in said second pair of pressurized fluid supply conduits, respectively;
  (i) first electro-magnetic outlet valves arranged in said first pair of brake-relieving conduits, respectively; and
  (j) second electro-magnetic outlet valves arranged in said second pair of brake-relieving conduits, respectively;

(B) first connecting means for connecting one ends of said first and second pairs of pressurized fluid supply conduits in one of, said hydraulic units, to a first brake fluid pressure generating chamber of a tandem master cylinder;

(C) second connecting means for connecting one ends said first and second pairs of pressurized fluid supply conduits in the other of said hydraulic units to a second brake fluid pressure generating chamber of said tandem master cylinder;

(D) third connecting means for connecting the other ends of said first pair of pressurized fluid supply conduits in one of said hydraulic units, to a wheel cylinder of one wheel of a first pair of wheels;

(E) fourth connecting means for connecting the other ends of said second pair of pressurized fluid supply conduits in the one of said hydraulic units, to a wheel cylinder of another wheel of said first pair of wheels;

(F) fifth connecting means for connecting the other ends of said first pair of pressurized fluid supply conduits in the other of said hydraulic units, to a wheel cylinder of one wheel of a second pair of wheels;

(G) sixth connecting means for connecting the other ends of said second pair of pressurized fluid supply conduits of the other of said hydraulic units, to a wheel cylinder of another wheel of said second pair of wheels;

wherein solenoid portions of said first and second electro-magnetic inlet valves, and said first and second electro-magnetic outlet valves, are electrically connected in series with each other, or in parallel with each other.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
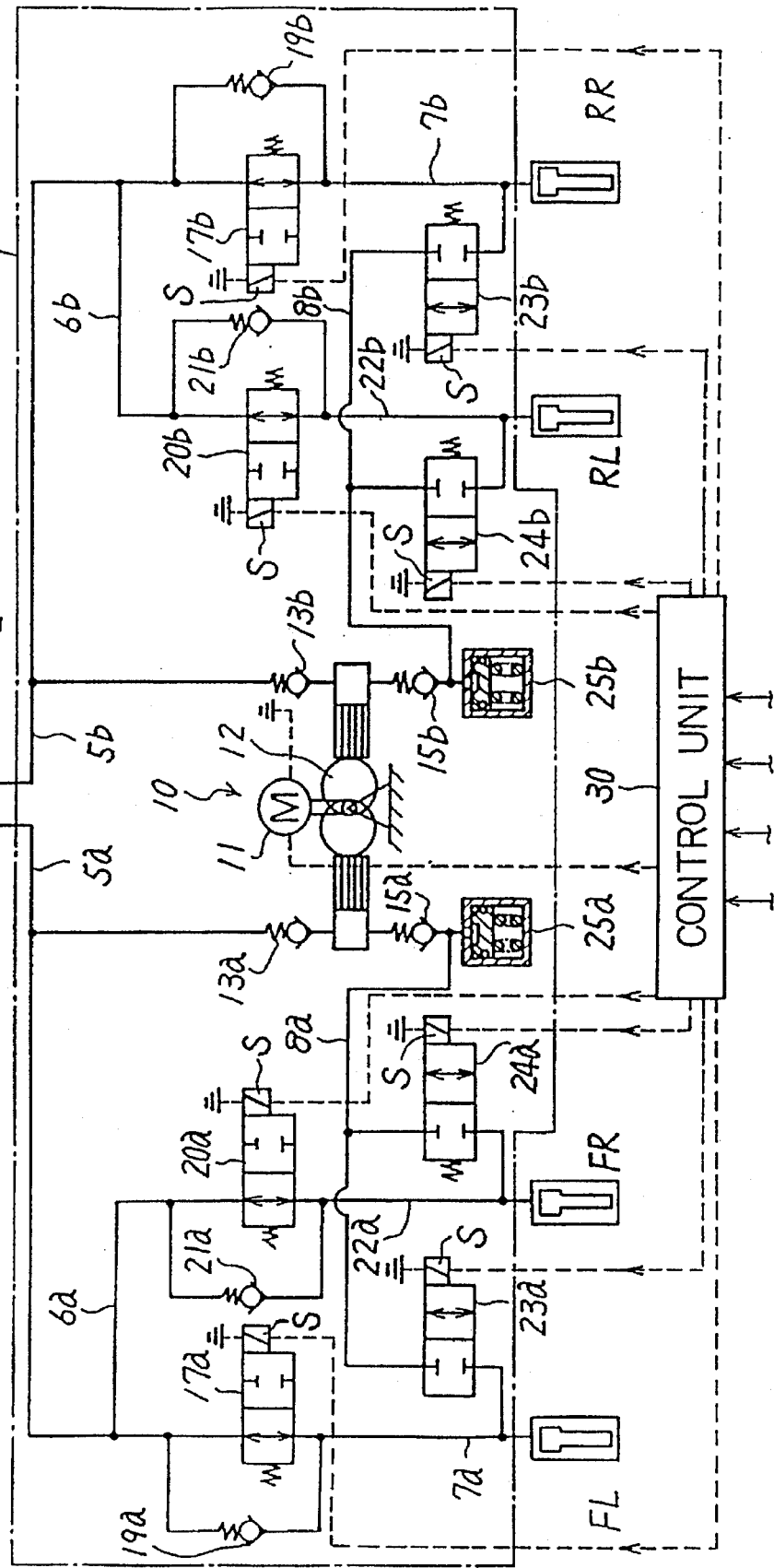
FIG. 1 is a conduit system of an anti-skid fluid pressure control apparatus of the Prior Art.
Figure 2:
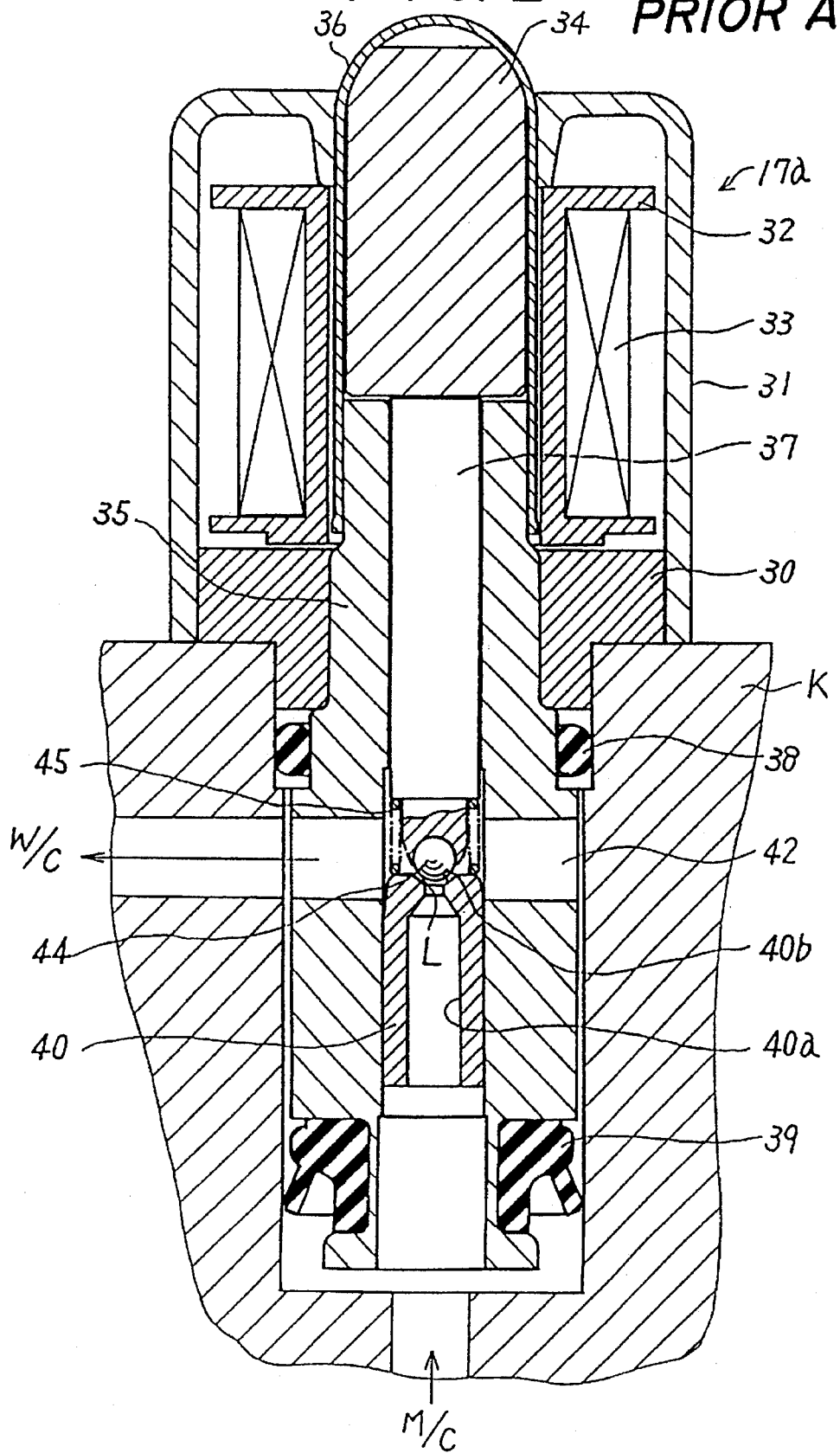
FIG. 2 (Prior Art) is a cross sectional view of an electric-magnetic change-over inlet valve used in the conduit system of FIG. 1.

Next, an anti-skid fluid pressure control apparatus according to a first embodiment of this invention will be described with reference to the drawings. Parts which correspond to those in the anti-skid fluid pressure control apparatus of the Prior Art, are denoted by the same reference numerals, the detail of which will be omitted.

This embodiment is applied to a truck. A capacity or volume of a tandem master cylinder 1' is larger than that of the Prior Art or an automobile. The master cylinder 1' consists of the booster portion 2', a master cylinder portion 3'. A brake pedal 4' is connected to the booster portion 3'. Conduits 41a and 41b are connected to fluid pressure generating chambers formed in the master cylinder portion 3'. The conduits 41a and 41b are divided into conduits 42a, 43a, 44a, 45a and 42b, 43b, 44b and 45b respectively. A first two-port two-position electro-magnetic change-over valve apparatus 50A, 50B, 51A, and 51B according to this invention are connected to the conduit 42a to 45b. Further, second two-port two-position electro-magnetic change-over valve apparatus 52A, 52B, 53A, and 53B are connected to wheel cylinders of the wheels FR', FL', RR', and RL'. They are connected through second two-port two-position electro-magnetic change-over valve apparatus 52A, 52B, 53A, and 53B to hydraulic reservoirs 25Aa, 25Ab, 25Ba, 25Bb.

In this embodiment, since much amount of the brake fluid is required for the truck in comparison to the automobile, there are provided two fluid pressure pumps 10A and 10B which have the same construction as the Prior Art. Since the constructions of the fluid pressure pumps 10A and 10B are equal to each other, only one of the fluid pressure pumps 10A and 10B will be described. Check valves 13A$a$ and 13A$b$ in a discharge side of the fluid pressure pumps 10A are connected, and they are connected through dumpers 55$a$ and 55$b$ and throttles 56$a$ and 56$b$ to the conduit 41$a$ connected to the master cylinder 1'.

The first two-port two-position electro-magnetic change-over apparatus 50A, 50B, 51A and 51B have the same construction as each other. Accordingly, only one 50A will be described. According to this embodiment, the first two-port two-position electro-magnetic change-over valve apparatus 50A consist of two-port two-position electro-magnetic change-over valves 60$a$ and 60$b$ connected in parallel with each other with respect to the conduits 41$a$. The first conduit in this invention consists of the conduits 41$a$, 42$a$ and 43$a$. Check valves g are connected in parallel with the two-port two-position change-over valves 60$a$, 60$b$ respectively. According to this invention, solenoid portions 60$as$ and 60$bs$ are electrically connected in series with each other. They are connected through an electric wire 91 to a terminal 40$a$ of the control unit 40. A DC voltage source of 24 volt in the control unit 40 can be connected to the terminal 40$a$. An electronic change-over switch is arranged between the DC voltage source and the terminal 40$a$. As above described, the control unit 40 judges always the skid conditions of the wheels. Usually it is turned off and when the solenoid portions 60$as$ and 60$bs$ are energized, the electronic switch is turned on. The two-port two-position electro-magnetic change-over valves 60$a$ and 60$b$ are constructed in the specification for the DC voltage of 12 V. Thus, they are standardized for the auto-mobile (small vehicle).

The second two-port two-position electro-magnetic change-over valves 52A is constructed in the same manner as the other two-port two-position electro-magnetic change-over valves 52B, 53A and 53B. Accordingly, the change-over valve apparatus 52A will be representatively described herein-after. It consists of two-position two-port electro-magnetic change-over valves 61$a$ and 61$b$ which are connected in parallel with each other with respect to the conduits 41$a$. They are usually put in the cut condition. When solenoid potions 61$as$ and 61$bs$ of them are energized, they are put into the communicating state. The solenoid portions 61$as$ and 61$bs$ of them are connected electrically in series with each other and through an electric wire 92 to a terminal 40$b$ of the control unit 40. The terminals 40$b$ is connected through an electronic switch to the second DC voltage source of 24 voltages in the control unit 40. When the electronic switch is turned on, the solenoid portions 61$as$ and 61$bs$ are energized. The terminals 40$a$ and 40$b$ may be connected through the electronic switches commonly to the DC voltage source of 24 voltages. A terminal 40$c$ of the control unit 40 is connected to an electric motor M for the fluid pressure pump 10A. The relationships between the other terminals of DC voltages sources arranged in the control unit 40 are the same as that between the terminals 40$a$, 40$b$ and the DC voltage source of 24 voltages.

In the above arrangement, the first fluid pressure supply conduit is constituted by the conduits 42$a$ and 43$a$. And the second fluid pressure supply conduit is constituted by the conduits 44$a$ and 45$a$. The first brake relieving conduit is constituted by the conduits $Q_1$ and $Q_2$. And the second brake relieving conduit is constituted by the conduits $Q_1'$ and $Q_2'$. The conduits Q and Q' represent the common portions of the conduits $Q_1$ and $Q_2$ and $Q_1'$ and $Q_2'$.

Portions $H_1$ and $H_2$ surrounded by dot-dash lines, are called generally "hydraulic unit". One hydraulic unit $H_1$ is connected to the pressurized fluid supply conduit 41$a$ which is connected to the master cylinder 1'. The hydraulic unit $H_2$ is connected to the other pressurized fluid pressure supply conduit 41$b$ which is connected to the master cylinder 1'. The hydraulic units $H_1$ and $H_2$ have the same construction as the hydraulic unit H of the Prior Art as shown in FIG. 1. However, the conduits 5$a$ and 5$b$ are connected in common. This invention and the Prior Art are different from each other only in electric connection for the solenoid portions.

There has been described construction of anti-skid fluid pressure control apparatus for truck according to the first embodiment of this invention. Next, the operation will be described.

When the driver depresses the brake pedal 4' the fluid pressure is transmitted through the conduit 41$a$, 41$b$, the diverging conduits 42$a$ to 45$b$ and two-port two-position electro-magnetic change-over valves 60$a$ and 60$b$ into the wheel cylinders of the wheels FR', FL', RR', RL'. Thus, the brake is applied to all of the wheels. In accordance with the surface condition of the road on which the vehicle is running and, the manner of depressing the brake pedal 4', the control unit 40 judges that the anti-skid control should be started.

For facilitating the understanding, all of the wheels are put in the same skid conditions. In this embodiment to maintain the braking force at constant, the electronic switch connected to the terminals 40$a$, 40$d$, 40$e$ and 40$j$ of the control unit 40 are turned on to energize the solenoid portion 60$as$ and 60$bs$ of the two-port two-position electro-magnetic change-over valves 60$a$ and 60$b$. Accordingly, the DC voltage of 24 voltages is applied through the electric wires 91, 95, 96 and 100 to the solenoid portions 60$bs$ and 60$as$. The energizing currents flow. Accordingly, the change-over valves 60$a$ and 60$b$ are put into the cut station. The supplies of the fluid pressures into the wheel cylinders stop. Thus, the fluid pressure, of the wheels FR', FL', RR', RL' are maintained at constant. Thus, the braking force is maintained at constant.

Next, the control unit 40 judges that the brake should be relieved. The first two-port two-position electro-magnetic change-over valves 60$a$ and 60$b$ remain cut and the solenoid portion 61$as$ and 61$bs$ of the two-port two-position electro-magnetic change-over valves apparatus 52A, 52B, 53A and 53B are energized. The electronic switches connected to the terminals 40$b$, 40$d$, 40$g$ and 40$i$ in the control unit 40 are turned on. Accordingly, the DC voltage sources of 24 voltage are connected to the solenoid portion 61$as$, 61$bs$ of the change-over outlet valve apparatus 52A, 52B, 53A, 53B. They are energized. Accordingly, the two-port two-position electro-magnetic change-over valves 61$a$ and 61$b$ are put into the communicating states. Thus, the pressurized fluid pressure is discharged from the wheel cylinders of the wheels FR', FL', RR', RL' into the hydraulic reservoirs 25A$a$, 25A$b$, 25B$a$, 25B$b$. When the control unit 40 judges that the brake should be relieved, a driving signal for the electronic motor M of the fluid pressure pumps 10A and 10B are supplied through the electric wires 93, 98 from the control unit 40. Accordingly, the fluid pressure pumps 10A and 10B start to drive. Accordingly, the brake fluid is discharged into the hydraulic reservoirs 25A$a$, 25A$b$, 25B$a$, 25B$b$ and sucked instantaneously from the hydraulic reservoirs 25A$a$, 25A$b$, 25B$a$, 25B$b$. And they are supplied as the pressurized fluid into the master cylinder 1'. In this embodiment, the discharging sides of the fluid pressure pumps 10A, 10B are connected to the check valves 13A$a$, 13A$b$ and dampers 55$a$ and 55$b$. Further, the throttles 56$a$ and 56b are connected to the discharging sides of the fluid pressure pumps 10A, 10B. Accordingly, the pulsating pressures are greatly reduced and returned through the conduits 41a and 41b to the master cylinder 1'. As the result, pedal kick to the driver is greatly reduced. Thus, when the second two-port two-position electro-magnetic change-over valve apparatus 52A, 52B, 53A and 53B are put into the communicating state, the brakes of the wheels FR', FL', RR', RL' are relieved.

In the manner as above described, the brake fluid from the master cylinder 1' is supplied to the wheel cylinders of the wheels FR', FL', RR' and RL' on braking. And the brake fluid is discharged from the wheel cylinders of the wheels into the hydraulic reservoirs 25Aa, 25Ab, 25Ba and 25Bb on brake relieving. When the anti-skid fluid pressure controller apparatus of this embodiment is used for the truck, the fluid amount of the brake fluid is more than for the automobile. And although two-port two-position electro-magnetic change-over valves 60a, 60b and 61a, 61b are manufactured by the specification for the auto-mobile (small vehicle), there is no problem. Because the solenoid portions of the change-over valves are connected in series with each other and the DC voltage is applied to the solenoid portions, the change-over valves are changed over surely into the cut state or communicating state. The two-port two-position electro-magnetic change-over valves are connected in parallel with each other with respect to the second conduits Q, Q' and the first conduits 41a and 41b. When the brake is applied and relieved, the brake fluid can be rapidly supplied into the wheel cylinder, and the brake fluid can be rapidly discharged from the wheel cylinder into the hydraulic reservoirs 25Aa to 25Bb. Accordingly, although the relatively small type of the two-port two-position electro-magnetic change-over valves 60a, 60b, 61a, 61b for 12 voltages are used, the brake can be rapidly applied and can be rapidly relieved. Thus, the change-over valves 60a, 60b, 61a and 61b for the automobile (small vehicle) can be used for the truck. Only one conduit system is merely added to the Prior Art anti-skid control apparatus. The manufacturing cost can be lowered in comparison with the Prior Art.

Figure 4:
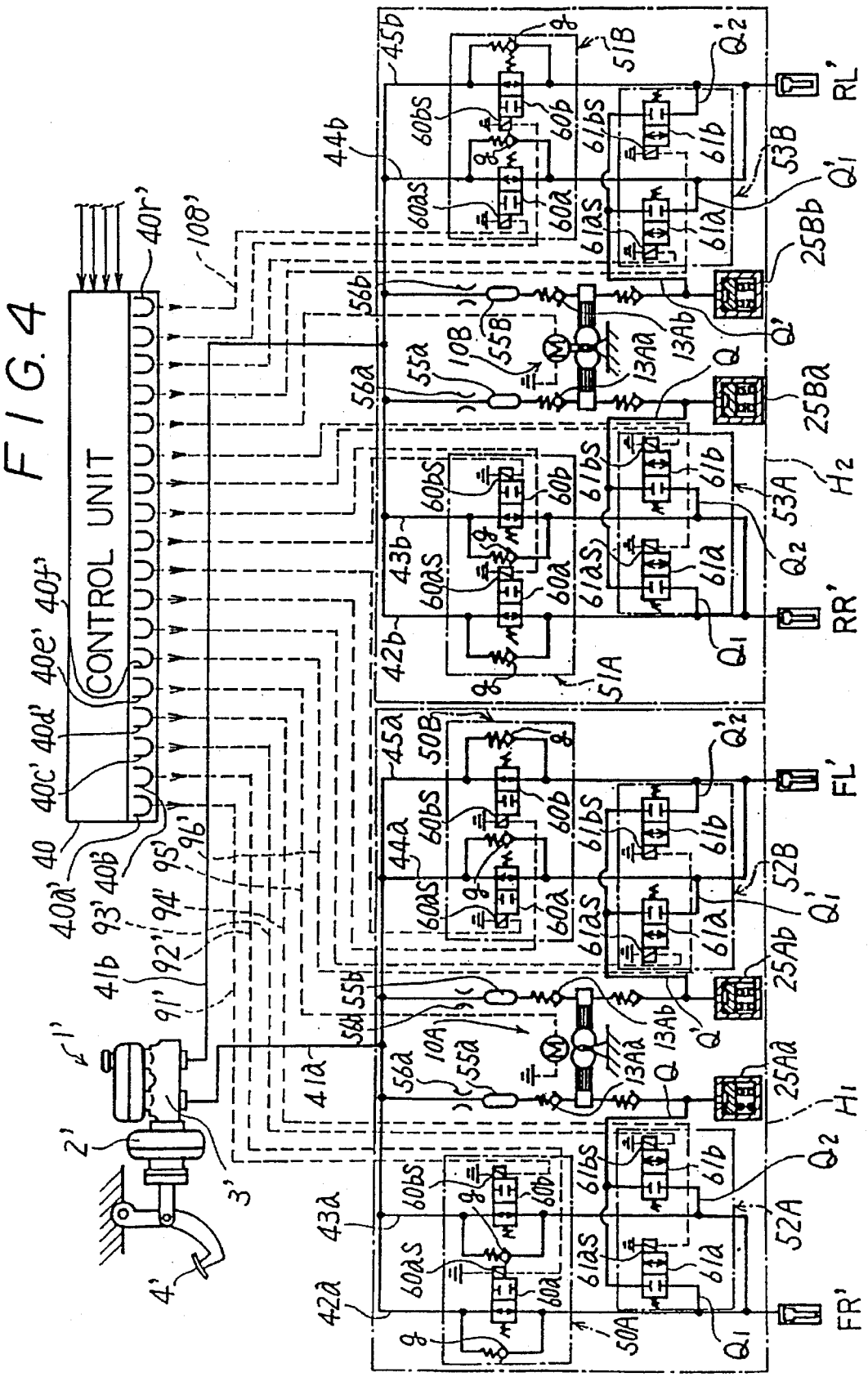
FIG. 4 is a conduit system of an anti-skid fluid pressure control apparatus according to a second embodiment of this invention.

FIG. 4 shows an anti-skid fluid pressure control apparatus for truck, according to a second embodiment of this invention. The parts which correspond to those in the first embodiment, are denoted by the same reference numerals, the detail of which will omitted.

Figure 3:
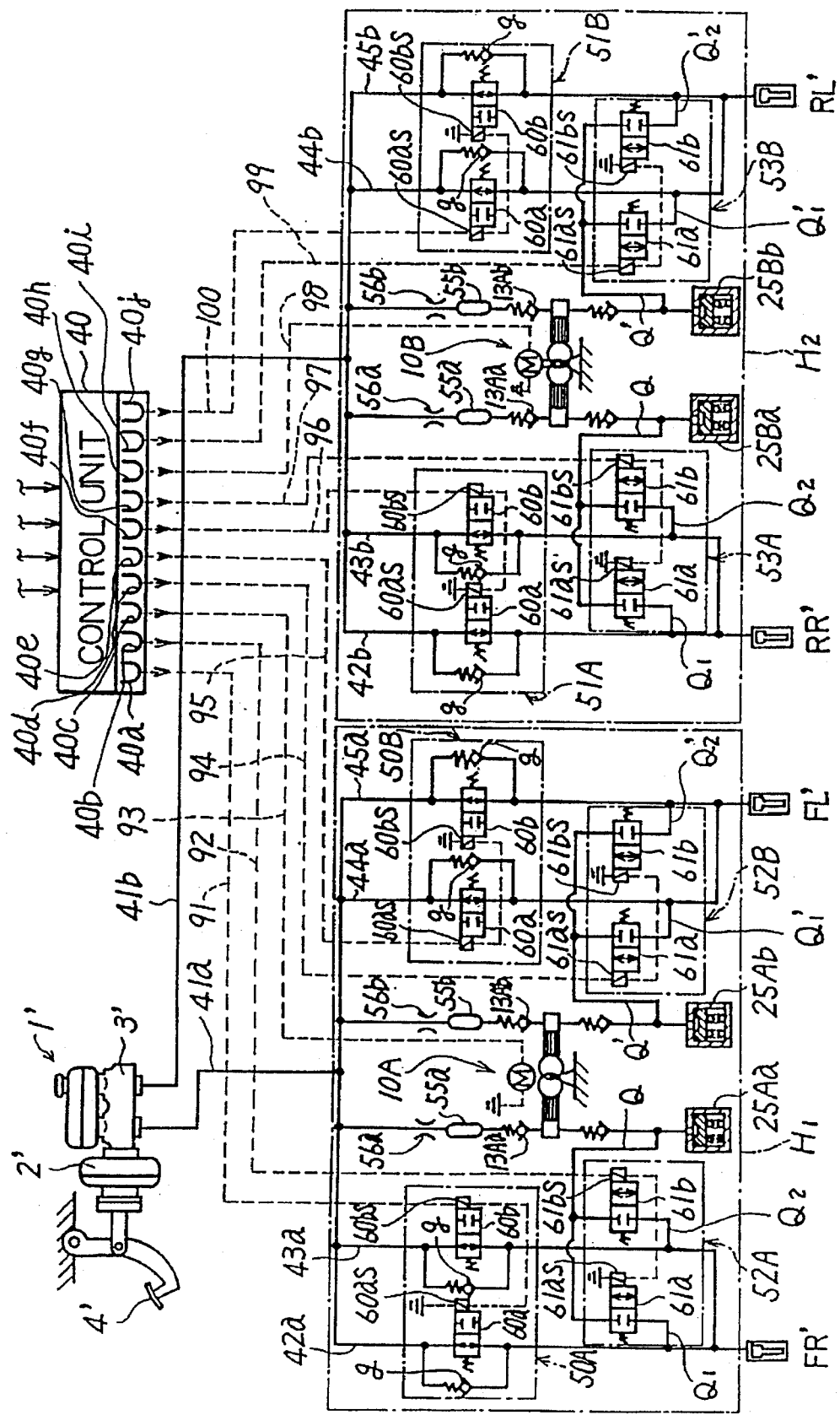
FIG. 3 is a conduit system of an anti-skid fluid pressure control apparatus according to a first embodiment of this invention.

Also in this embodiment, two-port two-position electro-magnetic change-over valves apparatus 50A to 51B and second two-port two-position electro-magnetic change-over valve apparatus 52A to 53B have the same construction as in the first embodiment. However, the solenoid portions 60as, 60bs and 61as, 61bs of these valves 60a, 60b, 61a, 61b are electrically connected in parallel with each other. Representatively, describing with respect to the first change-over value apparatus 50A, the solenoid portions 60as and 60bs are connected through wires 91' and 92' and terminals 40a' 40b' respectively and one electronic switch to a DC voltage source of 12 V in the control unit 40' in common. The power from the DC voltage source is supplied through the electronic switch into the solenoid portions 60as, 60bs. In the same manner, the solenoid portions 61as and 61bs of the second change-over value apparatus 52A are connected through wires 93' and 94', terminals 40c' and 40d' and one electronic switch to another DC voltage source of 12 V in the control unit 40'. The relationships among the first and second change-over valve apparatus 50B to 51B and 52B to 53B and wires 96' to 108', terminals 40f to 40r', each electronic switch and each DC voltage source, are the same as the above described relationships among the first and second change-over valve apparatuses. 50A and 52A, the wires 91' to 94', the terminals 40a' to 40d' and each one DC power source of 12 V. The change-over valves are specified for 12 voltages. There is no problem on such an electrical connection. On braking and on brake relieving, much brake fluid is supplied to the wheel cylinders and discharged therefrom into the hydraulic reservoirs 25Aa to 25Bb. Accordingly, the brake can be rapidly applied and rapidly relieved. The manufacturing cost is saved, as in the first embodiment. The cost can be reduced in comparison with the Prior Art. In the above embodiments, the hydraulic reservoirs 25Aa, 25Ab, 25Ba, 25Bb are provided for the respective wheels FR', FL', RR' and RL'. Accordingly, much brake fluid from the wheel cylinder can be received although the fluid pressure control apparatus of FIG. 3 and FIG. 4 is used for the truck.

While the preferred embodiments have been described, variations thereto will occur to those skilled in the art within the scope of the present inventive concepts which are delineated by the following claims.

For example, the above embodiments have been applied to the truck. Of course, this invention is not limited to the truck, but it may be applied generally to a large-size vehicle or a heavy-duty vehicle.

Further, the voltages of the DC power sources in the control unit are not limited to 12 V or 24 V, but they may be higher or lower than 12 V or 24 V.

For example, when the voltage of the DC power source is 12 voltages, solenoid portions of two electro-magnetic change-over valves for 6 V-specification may be electrically connected in series with each other.

Further, the two change-over valves are connected in parallel with each other with respect to the first or second conduit. More than two, for example, three change-over valves may be connected in parallel with one another, and solenoid portions of the change-over valves may be electrically connected in series with, or in parallel with one another, for the one DC voltage source.

In the above embodiments, the two fluid pressure pumps 10A and 10B have been used. However, when one fluid pressure pump having the double capacity of the above fluid. Pressure pumps 10A or 10B may be used in the above described embodiment.

What is claimed is:

1. An anti-skid fluid pressure control apparatus comprising;
 (A) a pair of hydraulic units, each of said hydraulic units comprising;
  (a) a first pair of pressurized fluid supply conduits;
  (b) a second pair of pressurized fluid supply conduits;
  (c) a first pair of brake-relieving conduits;
  (d) a second pair of brake-relieving conduits;
  (e) fluid pressure pump means;
  (f) hydraulic reservoir means;
  (g) first electro-magnetic inlet valves arranged in said first pair of pressurized fluid supply conduits, respectively;
  (h) second electro-magnetic inlet valves arranged in said second pair of pressurized fluid supply conduits, respectively;
  (i) first electro-magnetic outlet valves arranged in said first pair of brake-relieving conduits, respectively; and
  (j) second electro-magnetic outlet valves arranged in said second pair of brake-relieving conduits, respectively;

(B) first connecting means for connecting one ends of said first and second pairs of pressurized fluid supply conduits in one of said hydraulic units, to a first brake fluid pressure generating chamber of a tandem master cylinder;

(C) second connecting means for connecting one ends said first and second pairs of pressurized fluid supply conduits in the other of said hydraulic units to a second brake fluid pressure generating chamber of said tandem master cylinder;

(D) third connecting means for connecting the other ends of said first pair of pressurized fluid supply conduits in one of said hydraulic units, to a wheel cylinder of one wheel of a first pair of wheels;

(E) fourth connecting means for connecting the other ends of said second pair of pressurized fluid supply conduits in the one of said hydraulic units, to a wheel cylinder of another wheel of said first pair of wheels;

(F) fifth connecting means for connecting the other ends of said first pair of pressurized fluid supply conduits in the other of said hydraulic units, to a wheel cylinder of one wheel of a second pair of wheels;

(G) sixth connecting means for connecting the other ends of said second pair of pressurized fluid supply conduits of the other of said hydraulic units, to a wheel cylinder of another wheel of said second pair of wheels;

wherein solenoid portions of said first and second electro-magnetic inlet valves, and said first and second electro-magnetic outlet valves, are electrically connected in series with each other, or in parallel with each other.

2. In an anti-skid fluid pressure control apparatus including;

(A) a first electro-magnetic valve apparatus arranged in a first conduit connecting a master cylinder with a wheel cylinder;

(B) a second electro-magnetic valve apparatus arranged in a second conduit connecting said wheel cylinder with hydraulic reservoir means; and (C) fluid pressure pump means for sucking brake fluid discharged into said hydraulic reservoir means, and supplying pressurized brake fluid to the side of said master cylinder, wherein said first electro-magnetic change-over valve apparatus is put usually into the communicating state and when energized, is put into the cut state and second electro-magnetic change-over valve apparatus is put usually in the cut state and when energized, is changed-over into the communicating states and thereby the pressurized brake fluid supplied into said wheel cylinder is discharged into said hydraulic reservoir means and the brake fluid is sucked from said fluid pressure pump means and supplied to the side of said master cylinder, said first and second conduits consist of plural conduit portions which are connected in parallel with one another and said first and second electro-magnetic change-over valve apparatus consist of plural first and second electro-magnetic change-over valves, respectively which are arranged in said plural conduit portions, respectively, solenoid portions of said first and second electro-magnetic change-over valves are electrically connected in series with one another or in parallel with one another and electrically connected to predetermined DC electric sources through switiching means, respectively.

* * * * *